United States Patent Office 2,934,877
Patented May 3, 1960

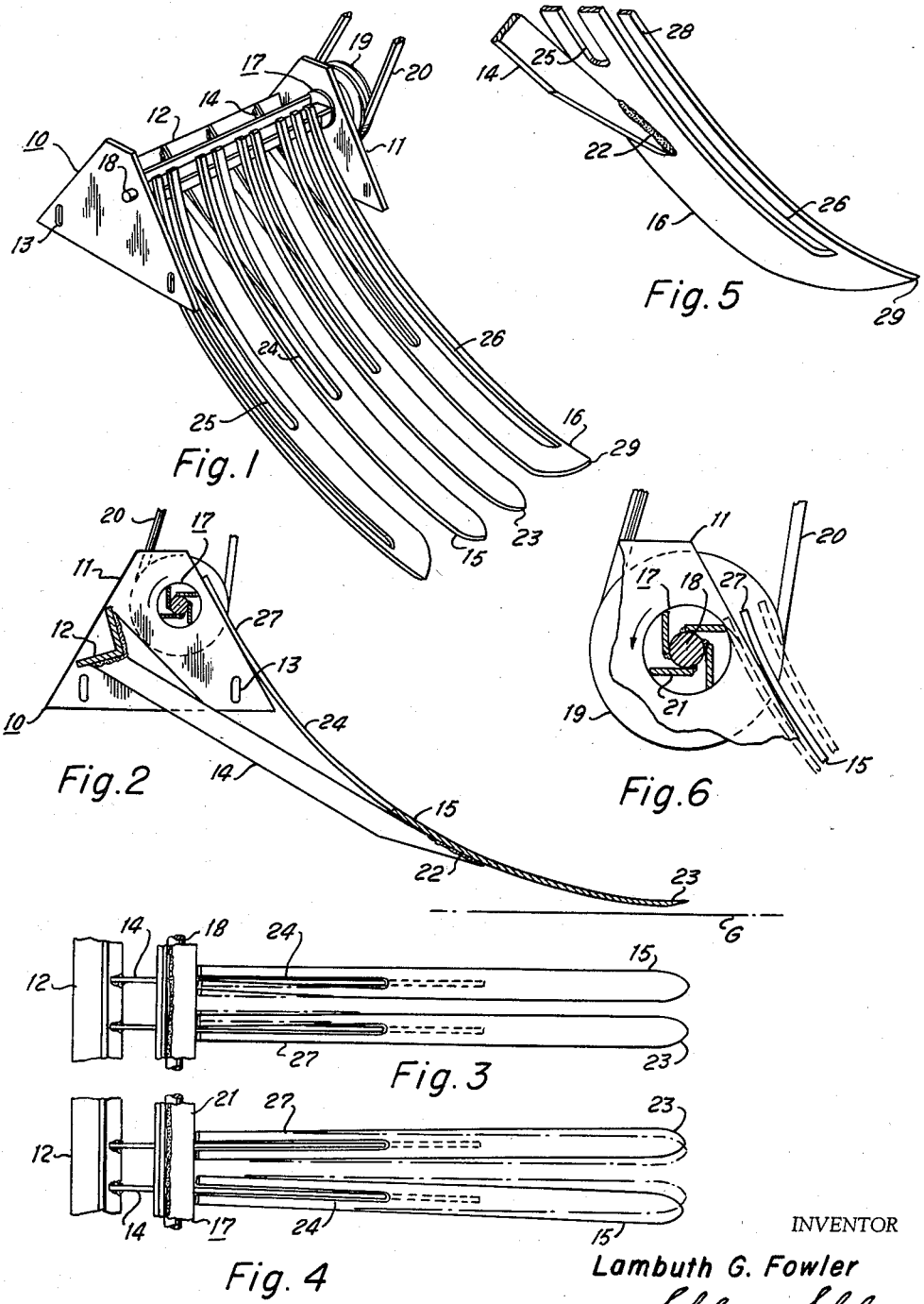

2,934,877

COTTON STRIPPING COMB

Lambuth G. Fowler, Lubbock, Tex.

Application April 11, 1958, Serial No. 727,926

12 Claims. (Cl. 56—34)

This invention relates to new and useful improvements in cotton stripping combs.

One object of the invention is to provide an improved cotton stripping comb having a plurality of flexible elements which are flexibly mounted and which are arranged to receive the stalks and branches of cotton plants therebetween for efficiently stripping bolls from the plants without breaking or uprooting the plants even though said plants are low or bushy or have limber or large stalks.

A particular object of the invention is to provide an improved cotton stripping comb, of the character described, wherein the flexible elements are closely-spaced and are independently mounted for movement relative to each other for accommodating the passage therebetween of stalks and branches of cotton plants or other matter of greater size than the width of the spaces between said elements or which branches or stalks are not alined with said spaces.

An important object of the invention is to provide an improved cotton stripping comb, of the character described, having means for coacting with its flexible elements to assist in stripping bolls and sifting out dirt, leaf trash and other extraneous matter as well as to salvage loose cotton clinging to the plants, the upper portions of the elements being capable of vertical flexing and being vibrated by engagement with the coacting means.

Another object of the invention is to provide an improved cotton stripping comb, of the character described, wherein its flexible elements are in the form of curved blades or elongated teeth having their intermediate portions attached to independent supports whereby the elements and particularly their end portions may undergo movement relative to adjacent elements and their end portions.

A further object of the invention is to provide an improved cotton stripping comb, of the character described, having a rotary member adjacent the upper ends of its flexible elements for striking the upper portions of the elements upon downward flexing thereof to limit the amplitude of movement of said upper portions while increasing the frequency of vibration and its duration.

A construction designed to carry out the invention will be hereinafter described, together with other features of the invention.

The invention will be more readily understood from a reading of the following specification and by reference to the accompanying drawing, wherein an example of the invention is shown, and wherein:

Fig. 1 is a perspective view of a cotton stripping comb constructed in accordance with the invention, Fig. 2 is a transverse, vertical, sectional view of the comb, Fig. 3 is a plan view of a portion of the comb with the lateral movement of the upper portions of its flexible elements being shown in broken lines, Fig. 4 is a view, similar to Fig. 3, showing lateral movement of the lower portions of the flexible elements, Fig. 5 is a rear perspective view with parts broken away and shown in section of the lower portion of one of the outer comb elements and its mounting, and Fig. 6 is an enlarged view of a portion of the device disclosed in Figure 2 showing the relationship of the rotary member to the upper ends of the flexible elements and, in broken lines, the vertical vibration of the element.

This application is a continuation-in-part of my copending application, Serial No. 599,256, filed July 20, 1956, now Patent No. 2,830,424.

In the drawing, the numeral 10 designates the frame of a stripping comb embodying the features of the invention and particularly adapted for use on cotton harvesters. The frame 10 includes a pair of upright, spaced side plates 11 which are substantially triangular and which are rigidly connected by a horizontal, transverse angle bar or cross bar 12. Elongated openings or slots 13 are formed in each side plate 11 to permit adjustable mounting of the frame on a cotton harvester (not shown). The angle bar 12 extends between the rear, medial portions of the side plates and has a plurality of forwardly and downwardly inclined, elongated arms or members 14 depending transversely therefrom in substantially parallel, spaced relationship for supporting inner and outer flexible stripper elements 15 and 16 in a substantially upright position.

As shown most clearly in Figs. 1, 2, and 6, a rotary member 17 is disposed between the angle bar 12 and the upper, rear ends of the flexible elements 15 and 16 and includes a horizontal, transverse shaft having its ends journaled in the side plates 11. One end of the shaft 18 carries a pulley 19 externally of the adjacent side plate for drivingly connecting said shaft by an endless belt 20 to a source of rotation (not shown). The member 17 is adapted to be rotated in a counter-clockwise direction and has a plurality of substantially coextensive blades or vanes 21 extending tangentially from its shaft. Since the rotary member is positioned adjacent the upper, rear ends of the flexible elements, its blades 21 are adapted to strike said upper ends when the same flex downwardly as shown in Fig. 6 so as to impart vertical vibration to said elements.

The upright flexible elements 15 and 16 are substantially arcuate or curved and are disposed in closely-spaced, parallel relation to one another and to the side plates 11 so as to extend forwardly and downwardly of the frame and longitudinally of the direction of movement of the harvester. As shown at 22 in Figs. 2 and 5, the intermediate portion of each flexible element is welded or otherwise secured to the front end of its supporting arm 14 whereby the end portions of each element are free or unattached to any rigid member and the elements are independent of one another. In order to increase the flexibility of the upper, rear portions of the elements and rigidify the lower, front portions thereof, the points of attachment 22 are more closely adjacent the lower, front ends of said elements. Each element is in the form of a flat blade or elongated tooth which is of greater width than thickness and constructed of spring steel or other resilient material. It is noted that the lower ends of the flexible elements extend forwardly of and below the front ends of the arms 14 so as to be in close proximity to the ground G (Fig. 2) and that the upper ends of said elements extend slightly above and forwardly of the rotary element 17. Since the elements are in substantial alinement with their supporting arms, the spaces therebetween are unobstructed for receiving the branches and stalks of cotton plants to strip bolls therefrom.

The inner elements 15 are different from the outer elements 16 and have their lower ends pointed as shown at 23. In order to increase its flexibility, the upper, rear portion of each element 15 is bifurcated by a medial, elongated opening or slot 24 which extends longitudinally of said portion from its upper extremity to a point adjacent its attachment to the arm at 22. A similar opening or slot 25 is formed in the upper, rear portion of each outer element 16 but is offset toward the inner longitudinal margin thereof. Another opening or slot 26, of much greater length and adjacent the outer longitudinal margin of each element 16 extends from its upper extremity to its lower end portion. Due to the slots 24, 25 and 26, each inner element has a pair of parallel, spaced fingers 27 at its upper, rear portion, while the upper, rear portion of each outer element has a trio of similar fingers 28 with the outermost finger being of greater length and flexibility than the other fingers. Although the lower end of each element 16 is pointed, as shown at 29, the point is one-sided and extends toward the inner margin of the element for directing the stalks and branches of cotton plants into the spaces between the inner and outer elements.

Due to their flexibility and their flexible mountings, the stripper elements may undergo limited movement independent of and relative to one another. As shown in Fig. 3, the fingers 27 as well as the fingers 28 are more flexible than the lower portions of the elements and may undergo independent, lateral flexing. This movement is permitted by the reduced width of the fingers and the location of the point of attachment 22 of the elements to the supporting arms 14 at the lower portion of said element. Although the lower portions of the elements may flex laterally as shown in Fig. 4, the same are more rigid than the upper portions so that said lower portions may undergo little, if any, vertical flexing. As a result, the lower ends of the elements do not have a tendency to dig into the ground G. This vertical rigidity and lateral flexibility of the lower portions of the elements are due, in part, to the length of the supporting arms 14 and said arms being in the form of flat bars of much greater vertical width than transverse thickness. Since the fingers may undergo vertical as well as lateral flexing, the upper ends of said fingers may move downwardly into the path of rotation of the rotary member 17. Although the member limits downward flexing of the fingers, its blades 21 strike said downwardly flexed fingers so as to cause vibration thereof for preventing the branches and stalks of cotton plants from hanging, breaking off and clogging the spaces between the elements. In other words, the frequency of vibration is increased while the amplitude of movement is reduced.

This oscillatory or vibratory movement of the fingers is particularly beneficial in sifting out dirt, leaf trash and other extraneous matter as well as in stripping bolls from the cotton plants and the passage of branches and stalks between the elements. The vertical flexing of the fingers or upper portions of the elements is primarily for the purpose of stripping bolls in coaction with the lateral flexing thereof. Also, the vertical flexing or vibration is prolonged by the rotary member so as to salvage loose cotton clinging to the plants. In addition to directing trash and heavier matter rearwardly, the rotary member tends to direct upwardly the loose cotton which may slip by the stripper elements.

Due to the lateral flexing of the elements, the spaces therebetween permit the passage of plant stalks and branches or other matter of greater size than the width of said spaces. The flexibility and close spacing of the elements makes possible snug engagement with the branches and stalks to efficiently strip bolls without breaking or uprooting the plants regardless of whether said plants are low or bushy or have limber or large stalks. Usually, the relatively-rigid, lower ends of the elements flex laterally to accommodate the passage of stalks of a diameter greater than the width of the space between said elements or stalks which are not in alinement with said spaces. As pointed out hereinbefore, vertical flexing of the lower ends is undesirable and unnecessary. Although the fingers increase the flexibility of the elements and provide a more efficient stripping action, it is noted that satisfactory results can be obtained without said fingers due to the independence and flexibility of each element and its mounting. Likewise, the rotary element could be omitted, but its use is preferable and more desirable because of the improved results obtained thereby.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A cotton stripping comb including a mounting frame having a substantially horizontal member, a plurality of spaced arms extending transversely from the member, and a substantially upright stripper element attached at its intermediate portion to the outer end of each arm with its upper and lower ends extending thereabove and therebelow and being free from attachment, the stripper elements being closely spaced for receiving the stalks and branches of cotton plants therebetween for stripping bolls from the plants and being independently supported by the arms for flexing movement relative to one another so as to prevent breaking and uprooting of the plants.

2. A cotton stripping comb as set forth in claim 1 including means on the frame adjacent the upper end portions of the stripper elements for engagement with said end portions to limit vertical flexing of said elements and increase the frequency of vibration thereof for preventing clogging of the spaces between said elements and for salvaging loose cotton.

3. A cotton stripping comb as set forth in claim 2 wherein the upper end portions of the stripper elements are more flexible than the lower end portions thereof whereby said upper end portions are vibrated by vertical flexing into engagement with the frame means.

4. A cotton stripping comb as set forth in claim 1 wherein the attachment of the intermediate portion of each stripper element to its supporting arm is more closely adjacent the lower end of the element than its upper end whereby the lower portion of said element is less flexible than its upper portion and is substantially inflexible vertically.

5. A cotton stripping comb as set forth in claim 1 wherein the upper end portion of each stripper element has a longitudinal slot to provide flexible fingers.

6. A cotton stripping comb as set forth in claim 1 wherein each stripper element is in the form of a curved flexible blade in substantial alinement with its supporting arm whereby the spaces between the blades are unobstructed.

7. A cotton stripping comb including a mounting frame having a substantially horizontal bar, a plurality of substantially upright flexible blades extending transversely of and spaced from the bar, the blades being closely spaced for receiving the stalks and branches of cotton plants therebetween for stripping bolls from the plants, and separate means extending from said bar to the intermediate portion of each blade for independently supporting the blade whereby said blades have free end portions and may flex and move relative to one another for snug engagement with the stalks and branches without breaking and uprooting the plants.

8. A cotton stripping comb as set forth in claim 7 wherein the blade supporting means include spaced arms depending from the bar in substantial alinement with the blades whereby the spaces between said blades are unobstructed.

9. A cotton stripping comb as set forth in claim 7 wherein the blades are substantially arcuate and of much greater lateral width than thickness.

10. A cotton stripping comb as set forth in claim 7 wherein the blades have their upper ends terminating adjacent the mounting frame, and a rotary member mounted on said frame adjacent the upper ends of said blades for striking the same upon vertical flexing of said blades to limit the amplitude of movement and increase the frequency of vibration thereof for preventing clogging of the spaces between said blades and for salvaging loose cotton.

11. A cotton stripping comb as set forth in claim 7 wherein the attachment of the intermediate portion of each blade to its supporting means is more closely adjacent the lower end than the upper end of the blade whereby the lower portion of said blade is substantially rigid and inflexible vertically.

12. A cotton stripping comb as set forth in claim 7 wherein the upper end portion of each blade has a longitudinal slot to provide flexible fingers.

References Cited in the file of this patent

UNITED STATES PATENTS

| | | |
|---|---|---|
| 2,544,411 | Altgelt | Mar. 6, 1951 |
| 2,616,236 | Hartley | Nov. 4, 1952 |